United States Patent [19]

Campbell et al.

[11] Patent Number: 5,911,482
[45] Date of Patent: Jun. 15, 1999

[54] WINDOW ASSEMBLY AND LOWER SAW GUARD

[75] Inventors: David C. Campbell, Bel Air; Lynn E. Lentino, Westminster; Gale A. Heslop, Carney, all of Md.

[73] Assignee: Black & Decker, inc., Newark, Del.

[21] Appl. No.: 09/005,814

[22] Filed: Jan. 12, 1998

Related U.S. Application Data

[63] Continuation of application No. 08/655,991, May 31, 1996, Pat. No. 5,794,351.

[51] Int. Cl.⁶ ..................................................... B23D 47/00
[52] U.S. Cl. ................................. 30/390; 30/391; 83/478; 83/520
[58] Field of Search ........................ 30/390, 391; 83/377, 83/478, 440.2, 520

[56] References Cited

U.S. PATENT DOCUMENTS

| | | |
|---|---|---|
| 1,830,579 | 11/1931 | Wappat . |
| 2,795,248 | 6/1957 | Doerner . |
| 2,876,810 | 3/1959 | Peterson et al. . |
| 3,662,796 | 5/1972 | Batistelli . |
| 3,805,658 | 4/1974 | Scott et al. . |
| 3,880,032 | 4/1975 | Green . |
| 3,990,145 | 11/1976 | Rubin . |
| 4,257,297 | 3/1981 | Nidbella . |
| 4,450,627 | 5/1984 | Morimoto . |
| 4,675,999 | 6/1987 | Ito et al. . |
| 5,046,255 | 9/1991 | Lebreux . |
| 5,084,972 | 2/1992 | Waugh . |
| 5,199,343 | 4/1993 | O'Banion . |
| 5,375,495 | 12/1994 | Bosten et al. . |
| 5,794,351 | 8/1998 | Campbell et al. ......................... 30/390 |

FOREIGN PATENT DOCUMENTS

| | | |
|---|---|---|
| 498325 | 5/1930 | Germany . |
| 51-102891 | 8/1976 | Japan . |
| 5-318403 | 5/1992 | Japan . |

OTHER PUBLICATIONS

Abstract No. 674,894, dated May 17, 1950 to Roe.
Abstract No. 887,003, dated Oct. 26, 1959 to Horstmann & Sherwen Ltd.
Abstract No. 1,016,387, dated Oct. 1, 1963 to Rockwell Mfg. Co.
Abstract No. 1,315,720, dated Jan. 12, 1972, to Cape Universal Building Products, Ltd.

*Primary Examiner*—Douglas D. Watts
*Attorney, Agent, or Firm*—Shook, Hardy & Bacon L.L.P.

[57] ABSTRACT

A window assembly is provided for use on a hand-held circular saw. The window assembly has a transparent member that is attached to an upper guard of the saw in a covering relationship with an aperture provided in the upper guard. A projecting rib is provided that is coupled to and which extends outwardly from the guard adjacent the forward edge of the transparent member. The projecting rib substantially prevents light emanating forwardly of the saw from reflecting off of the member.

7 Claims, 3 Drawing Sheets

WINDOW ASSEMBLY AND LOWER SAW GUARD

CROSS-REFERENCE TO RELATED APPLICATIONS

This application is a continuation of, and claims the benefit of, application Ser. No. 08/655,991 filed on May 31, 1996, now U.S. Pat. No. 5,794,351.

BACKGROUND OF THE INVENTION

This invention relates to a circular saw having a viewing window on the upper guard.

One of the problems associated with the use of a hand-held circular saw is properly aligning the saw so that the desired cut is achieved. Typically, a user will draw a line on the material to be cut. This line represents the location of the desired cut. The problem arises when the user of the hand-held circular saw attempts to align the blade with the line on the material. The problem continues as the user attempts to keep the blade tracking on the desired cut line.

To assist in the alignment, circular saws are typically provided with a guide slot. The guide slot is usually located on the planar cutting base of the saw, and is positioned in front of, and in line with, the circular saw blade. The user then positions the saw so that the line on the material appears in the guide slot. While the provision of such a guide slot does aid the user in proper saw alignment, problems still exist. First, because the guide slot is located in front of the blade, if the saw blade is not perpendicular relative to the workpiece, the guide slot can be positioned on the cut line while the blade is not. If the user begins to cut the material with the saw in this orientation, it is often difficult to correct the alignment problem. Second, because the blade is covered by a saw guard, the user cannot see the blade as it exits the material, and therefore cannot directly monitor the travel of the blade.

Attempts have been made to allow the user of the saw to view the blade as it exits the material, thereby allowing the user to properly guide the blade along the desired cut line. A device that allows a user to view the blade is disclosed in U.S. Pat. No. 4,450,627. This patent discloses a circular saw with a viewing window on the upper saw guard. The window is intended to allow users of the saw to properly align the saw to the workpiece by allowing them to view the blade. While this viewing window solves the above problems to some degree, its positioning remains a problem.

If the viewing window is not properly positioned, the user will be unable to see the blade exiting the material due to the reflection of light by the transparent section of the viewing window. To compensate, the user may attempt to reposition the light source, such as a flashlight, or may reposition himself relative to the saw. This repositioning can affect efficiency as well as the quality of the work being performed. If the user repositions himself relative to the saw, the resulting position may be an uncomfortable one from which to operate the saw. Further, the trial and error necessary to find the proper position of saw, user and light source wastes the user's time.

The position of the viewing window must also account for the sawdust generated as the saw cuts through the workpiece. If the window is positioned to far forwardly, the sawdust can accumulate on the transparent section of the window and impair the user's view of the blade as it exits the workpiece. The viewing window must therefore be positioned so as to minimize or eliminate the accumulation of sawdust on the viewing window.

Further, circular saws having a viewing window have heretofore not adequately addressed the problem caused by the lower saw guard in relation to the provision of a viewing window. The lower saw guard surrounds the lower portion of the blade when the saw is not in use. When the saw is being used, the front portion of the lower saw guard engages the workpiece and is rotated upwardly to expose the lower portion of the blade. When the lower guard is rotated fully upwardly, the rear portion of the lower saw guard can impair the user's view of the blade through the transparent section of the viewing window. This impairment does not affect the user's view as the cut is initiated, but rather impairs the view when the saw is sufficiently engaged with the workpiece so as to rotate the lower guard to a fully retracted position.

Therefore, a window assembly is needed that is properly positioned in the upper saw guard of a circular saw so that the user can view, from a normal operating position, the blade exiting the workpiece. A window assembly is needed that minimizes any light reflected into the eyes of the user from both above and in front of the viewing window. Further, a window assembly is needed that is properly positioned in the upper saw guard of a circular saw so that the accumulation of sawdust on the viewing window is reduced or eliminated. Finally, a lower saw guard is needed which will allow a user to view the saw blade exiting the workpiece, through a transparent member of the window assembly in the upper saw guard, even when the lower guard is in a fully retracted position.

BRIEF SUMMARY OF THE INVENTION

Accordingly, it is an object of the present invention to provide a window assembly in the upper guard of a circular saw positioned so as to minimize any light reflected into the eyes of the person using the saw.

It is another object of the present invention to provide a window assembly located rearwardly of a predetermined point to minimize accumulation of sawdust on the window assembly.

A further object of this invention is to provide a window assembly having a transparent member oriented at an angle greater than a minimum angle of inclination of the viewing window relative to the workpiece.

A still further object of this invention is to provide a window assembly having a transparent member oriented at an angle less than a maximum angle of inclination of the viewing window relative to the workpiece.

Yet another object of the invention is to provide a lower saw guard, to be used on a circular saw with a viewing window, that will not obstruct the view through the transparent member of the window even in a fully retracted position.

According to the present invention, the foregoing and other objects are obtained by a window assembly for use on a hand-held circular saw. The window assembly has a transparent member that is attached to an upper guard of the saw, and that has a top surface, a forward edge and a rearward edge. The transparent member slopes downwardly to form a rearwardly facing acute angle with respect to a planar base of the saw. The acute angle has a minimum value which prevents light from overhead sources from reflecting into the user's eyes and has a maximum value which prevents light from forward light sources from reflecting into the user's eyes. In another aspect of the invention, the forward edge of the transparent member is located where a predetermined line intersects the guard. This location prevents sawdust from accumulating on the transparent member. In still another aspect of the invention, a lower blade guard is provided for use on a circular saw having a clear viewing window on the upper blade guard. The lower blade guard has a truncated portion that allows a line of sight between the workpiece being sawed and the transparent member of the window assembly even when the lower guard is in a fully retracted position.

To locate the forward-most point of the transparent member of the window assembly, a line is constructed extending tangentially away from the blade at the point at which the saw blade exits the workpiece. This line intersects the upper blade guard. The window is placed rearwardly of this intersection point.

To establish the minimum angle of inclination for the transparent member of the window assembly, a first line is constructed from the point at which the blade exits the workpiece to the rear edge of the transparent member of the window assembly. A second line is then constructed extending horizontally outward from the rear edge of the top surface of the transparent member. A third line is constructed bisecting the angle formed by the previous two lines. This third line establishes the minimum angle of inclination for the top surface of the transparent member.

To establish the maximum angle of inclination for the transparent member of the window assembly, a first line is constructed as above. Thereafter, a forward point is located six inches in front of the point at which the blade exits the workpiece. A second line is constructed from this forward point to the rear edge of the transparent member. A third line is then constructed bisecting the angle formed by the first and second lines. This third line represents the maximum angle of inclination for the top surface of the transparent member.

BRIEF DESCRIPTION OF SEVERAL VIEWS OF THE DRAWING

In the accompanying drawings which form a part of this specification and which are to be read in conjunction therewith and in which like reference numerals are used to indicate like parts in the various views.

DETAILED DESCRIPTION OF THE INVENTION

Figure 1:
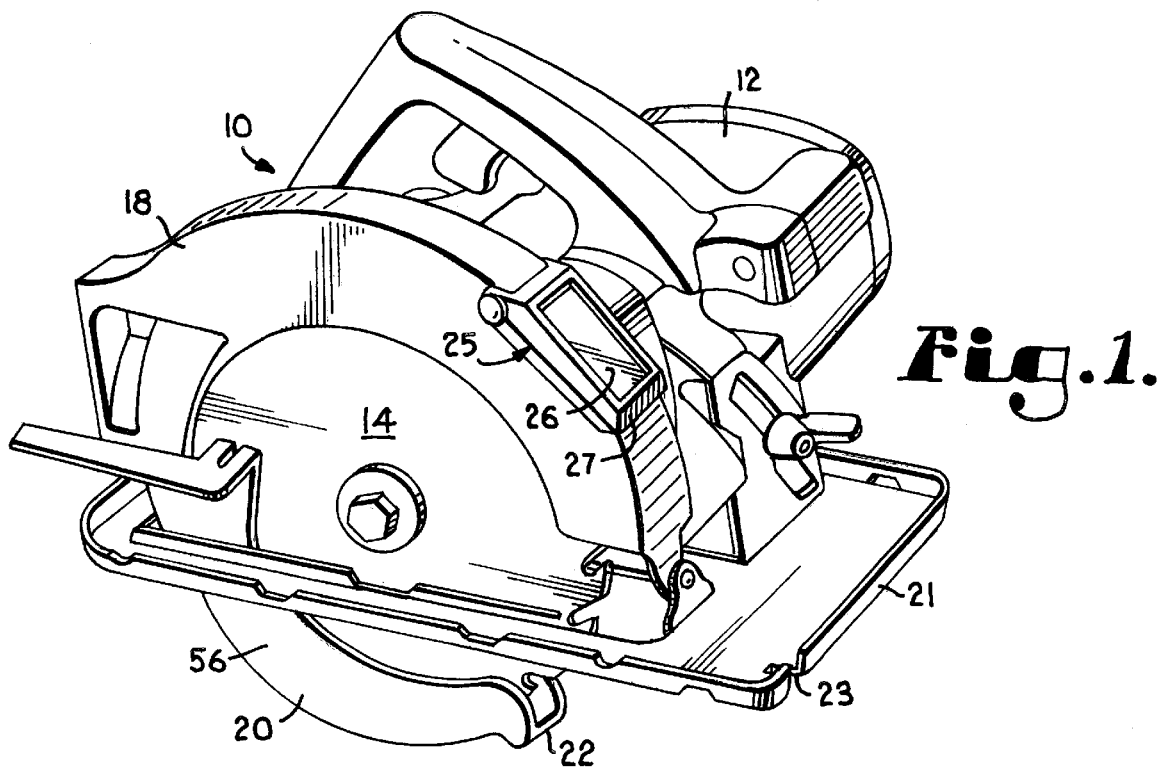
FIG. 1 is a front perspective view showing a properly located window assembly of the present invention attached to the upper guard of a circular saw.

Referring to the drawings in greater detail, and initially to FIG. 1, a power circular saw designated generally by numeral 10 is shown. Saw 10 has a motor 12 which is operably attached to a circular saw blade 14. A power cord (not shown) supplies electrical power to motor 12. The upper portion of blade 14 is surrounded by an upper saw guard 18. Upper guard 18 is fixedly secured to motor 12. The lower portion of blade 14 is surrounded by a lower saw guard 20. Saw 10 further has a planar base 21 with an alignment notch 23.

Lower guard 20 exposes the lower portion of blade 14 in a manner that is well-known in the art. More specifically, the front edge 22 of lower guard 20 engages the leading edge of a workpiece 24. As the saw passes further into workpiece 24, lower guard 20 is rotated generally upwardly to expose the lower portion of the blade. Guard 20 is spring loaded so that when saw 10 is disengaged from workpiece 24, lower guard 20 returns to its lower, blade covering position.

Upper guard 18 is provided with a viewing window assembly 25. Window assembly 25 has a transparent member 26 which is held in place on guard 18 by a window frame 27. Transparent member 26 allows the user of saw 10 to view blade 14 as it exits workpiece 24, thereby allowing the user to properly align, and maintain alignment, of saw 10.

Transparent member 26 must be properly positioned on guard 18 to allow the user of saw 10 to properly align and monitor the travel of blade 14. First, the forward-most position of transparent member 26 on guard 18 must be determined. Locating transparent member 26 beyond the proper forward-most position can result in the sawdust generated by blade 14 accumulating on transparent member 26. If sawdust accumulates on transparent member 26, either transparent member 26 must be cleaned or the user's view through transparent member 26 will be obstructed by sawdust. Further, the proper angle of inclination of transparent member 26 must be determined and used. Generally, there is a range between a minimum angle of inclination and a maximum angle of inclination that may be used. If transparent member 26 has an angle of inclination different from the angles calculated in the manner described below, the user's view through transparent member 26 will be impaired by light reflecting from the top surface of transparent member 26.

Figure 2:
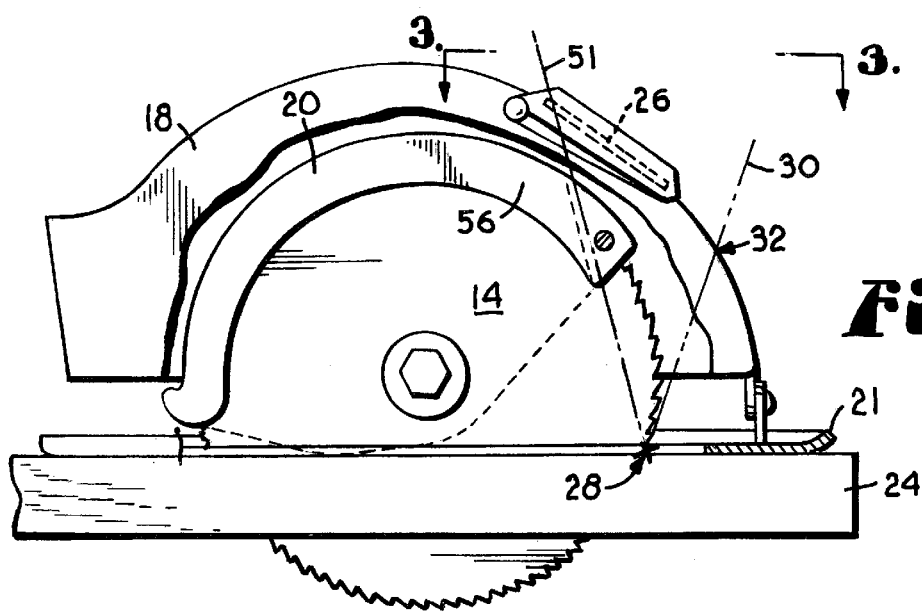
FIG. 2 is a side elevation view of the saw of FIG. 1 showing the lower guard in a fully retracted position.

In order to determine the forward-most position of transparent member 26 on guard 18, the point at which blade 14 exits workpiece 24 is first located. This point is designated in the drawings by reference numeral 28. The cutting depth for blade 14 can be adjusted by repositioning planar base 21 so that thinner or thicker workpieces may be sawed. Manufacturers typically ship saw 10 with blade 14 at its maximum cutting depth. In determining exit point 28, blade 14 should be set at maximum depth which is the most common depth utilized by saw users. As shown in FIG. 2, from point 28, a line is constructed extending tangentially away from blade 14 and upwardly towards guard 18. This tangential line is designated in the drawings by the reference numeral 30. The point at which line 30 intersects guard 18 defines the maximum forward-most point at which the forward edge of transparent member 26 should be positioned. This intersection point is defined in the drawings by reference numeral 32. Locating transparent member 26 at or behind intersection point 32 ensures that transparent member 26 is located behind the main path of the dust particles generated by blade 14 when saw 10 engages workpiece 24. Such a location will decrease the need and frequency at which transparent member 26 must be cleaned. Therefore, locating transparent member 26 rearwardly of intersection point 32 increases the ability of the user of saw 10 to view blade exit point 28 without having the view obstructed or impaired by sawdust particles.

Figure 5:
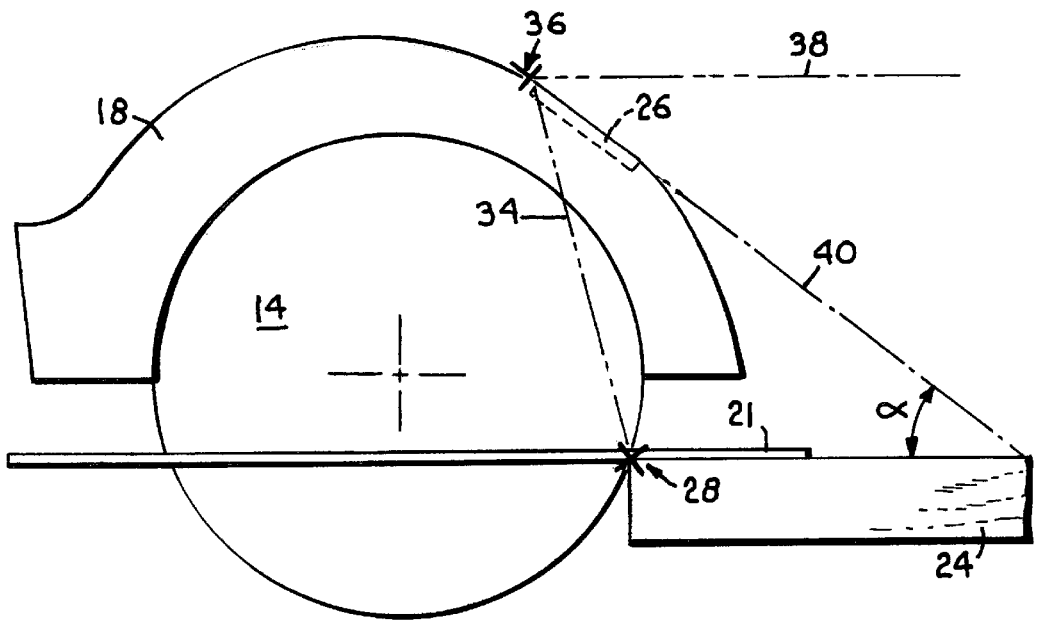
FIG. 5 is a schematic view of the saw of FIG. 1, illustrating the method of calculating the minimum angle of inclination for the transparent member of the window assembly.

Having properly located the forward-most point for transparent member 26, the proper angles of inclination of transparent member 26 must also be determined. Referring to FIG. 5, to determine the minimum angle of inclination, a line is constructed between blade exit point 28 and the rear edge of transparent member 26. Again, this line is constructed with blade 14 at its maximum cutting depth. The rear edge of transparent member 26 is located on guard 18 to allow a line of sight between the user in a normal saw operating position and blade exit point 28. The line between blade exit point 28 and the rear edge of transparent member 26 is shown in the drawings by reference numeral 34. The point at which line 34 intersects guard 18 and the rear edge of the top surface of transparent member 26 is shown in the drawings by reference numeral 36. A second line 38 is constructed extending from point 36 outwardly from guard 18. Line 38 is constructed to be horizontal so that it will be substantially parallel to workpiece 24 and planar base 21. A third line 40 is constructed and extends from point 36 downwardly between lines 34 and 38. Line 40 is constructed so as to bisect the angle formed by first line 34 and line 38. Line 40 establishes the minimum angle of inclination, indicated by $\alpha$ in the drawings, for transparent member 26. Therefore, the angle formed by the plane of the top surface of transparent member 26 relative to workpiece 24 should be no less than the acute angle $\alpha$ established between line 40 and workpiece 24. When transparent member 26 has an angle of inclination equal to or greater than this minimum angle, only light originating from below line 38 is capable of reflecting into the eyes of the user. Any light originating from above line 38, such as from a ceiling light, will reflect away from the user's eyes.

Figure 6:
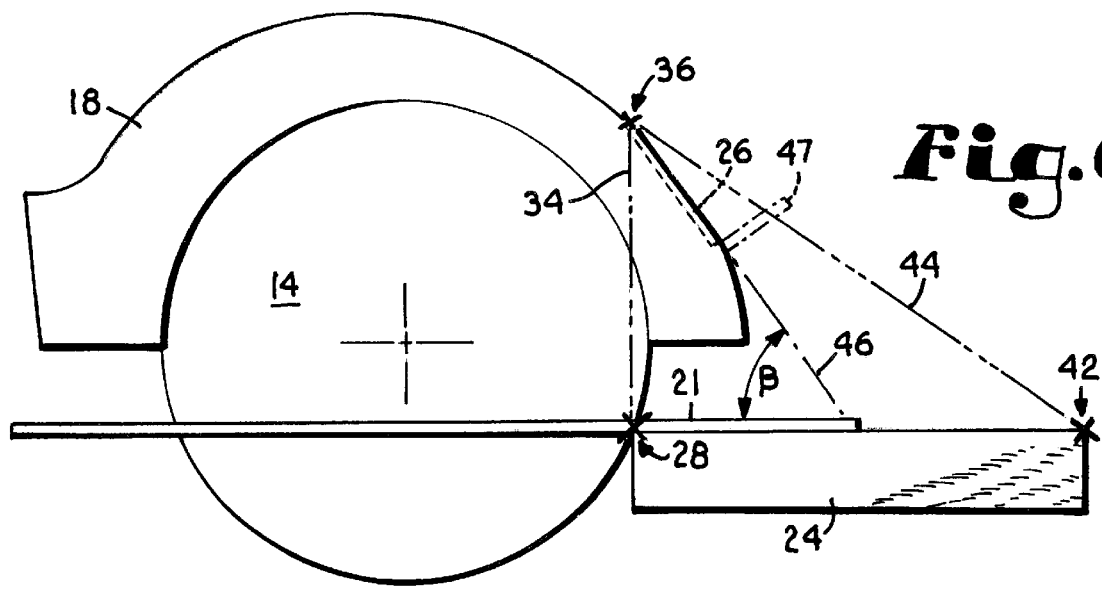
FIG. 6 is a schematic view similar to FIG. 5, illustrating the method of calculating the maximum angle of inclination for the transparent member of the window assembly.

Having determined the minimum angle of inclination, the maximum angle of inclination for transparent member 26 can be determined as outlined below, with reference to FIG. 6, to establish the range of angles that may be used for transparent member 26. In determining the maximum angle of inclination, first line 34 is constructed in the same manner as for determining the minimum angle of inclination. Therefore, point 36 is determined in the same fashion with blade 14 at its maximum depth. Next, a forward point 42 is located six inches directly in front of blade exit point 28, in a line extending from, and in line with, blade 14. Forward point 42 represents the distant edge of a typical workpiece 24, the importance of which is more fully discussed below. A fourth line 44 is constructed connecting forward point 42 with intersection point 36. Thereafter, a fifth line 46 is constructed bisecting the angle formed by first line 34 and fourth line 44. Fifth line 46 establishes the maximum angle of inclination of transparent member 26, indicated by $\beta$ in the drawings. Therefore, the angle formed by the plane of transparent member 26 relative to workpiece 24 should be no greater than the acute angle $\beta$ established between line 46 and workpiece 24. Workpiece 24 is often light in color and thus can reflect a considerable amount of light. When transparent member 26 has an angle of inclination equal to or less than this maximum angle $\beta$, the operator will only be able to see a reflection of the top surface of workpiece 24 from about point 42 and beyond. Therefore, because the typical workpiece is approximately six inches wide, orienting transparent member 26 with an angle of inclination equal to or less than the acute angle $\beta$ prevents the majority of light reflected from workpiece 24 from reaching the user's eyes. Thus, the user will be better able to view the blade exit point as the cut is made.

By locating transparent member 26 rearwardly of point 32 and between the minimum angle of inclination a and the maximum angle of inclination $\beta$ as determined above, transparent member 26 will be located in a position which minimizes any obstruction caused by sawdust, and which allows the user to view exit point 28 through transparent member 26 without his or her vision being obstructed by unwanted reflections from the top surface of transparent member 26.

In an alternative embodiment, transparent member 26 is oriented with an angle of inclination equal to or greater than the acute angle $\alpha$. In this embodiment an opaque vertical rib 47, shown in dashed lines in FIG. 6, is attached to upper guard 18 adjacent the forward edge of transparent member 26. Again, orienting transparent member 26 at an angle greater than acute angle $\alpha$ prevents light from overhead sources from reflecting into the user's eyes. Rib 47 extends outwardly from upper guard 18 and thus prevents light from any forward light sources from reflecting into the user's eyes. Rib 47 could also extend along the sides of transparent member 26 if it is desired to block light sources from the sides. Thus, the orientation of transparent member 26, at an angle greater than the minimum angle of inclination, and rib 47 operate to block unwanted reflections so that the user can view exit point 28 through transparent member 26.

Figure 3:
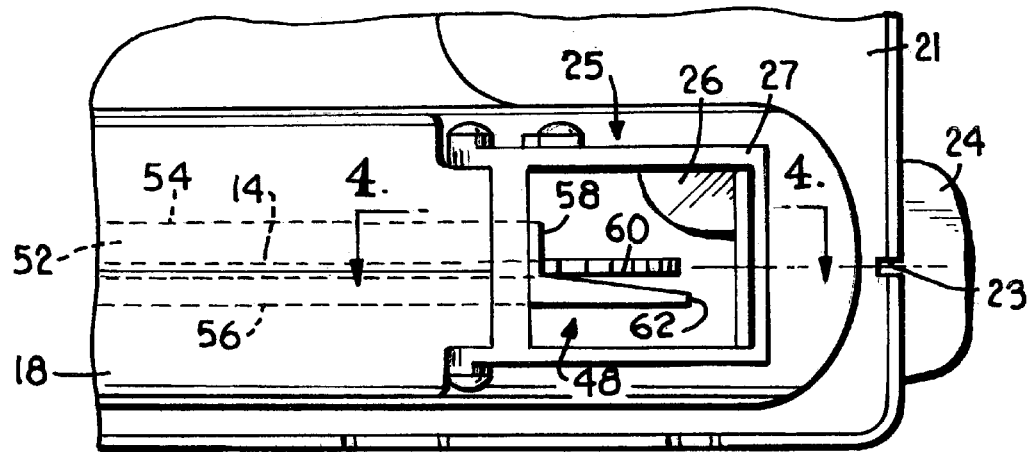
FIG. 3 is an enlarged partial top plan view taken along line 3—3 of FIG. 2, with part of the transparent member being broken away to show particular details of construction.
Figure 4:
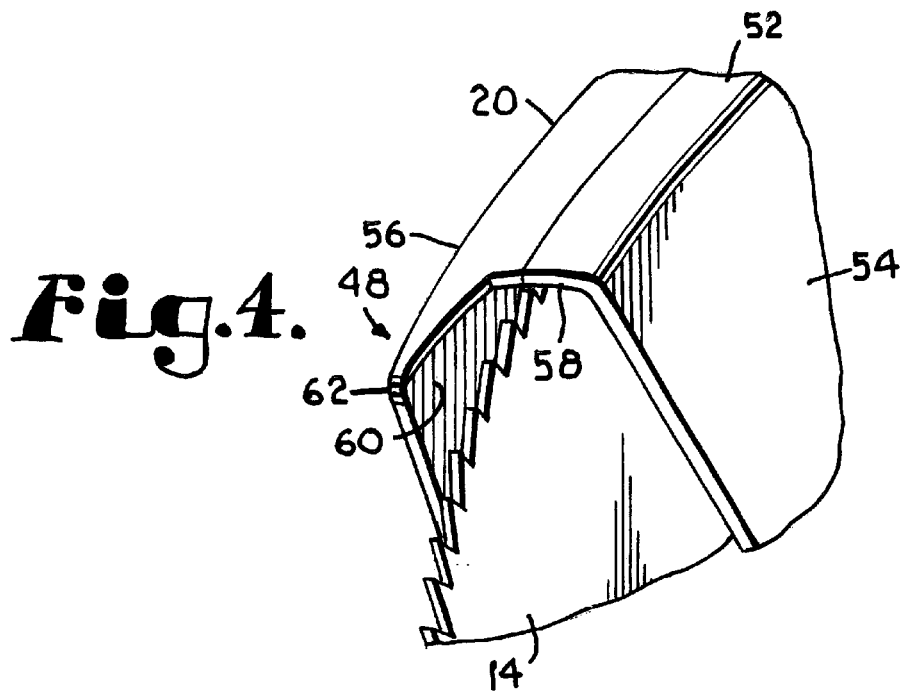
FIG. 4 is an enlarged partial perspective view taken along line 4—4 of FIG. 3 showing the lower guard in a fully retracted position.

As outlined above, a properly positioned window assembly having a transparent member allows the user of saw 10 to view workpiece 24 free of unwanted reflections and sawdust obstructions. However, even with a properly positioned window assembly, the user's view of the point at which the blade exits the workpiece can be obstructed by the lower guard. Such an obstruction can result when the lower guard is in a fully rotated position. Therefore, lower guard 20 of the present invention has a truncated portion 48 on a rear section of lower guard 20, as best seen in FIGS. 3 and 4. Truncated portion 48 allows the user of saw 10 to view blade 14 as it exits the workpiece, even when lower guard 20 is in a fully retracted position, as shown in FIGS. 2 and 3. A line of sight is maintained through transparent member 26 to blade exit point 28, as illustrated by reference line 51 in FIG. 2.

Lower guard 20 has a perimeter wall 52 that extends between an inner side 54 and an outer side 56. Truncated portion 48 is formed as a "cut-out" from perimeter wall 52 and inner side 54, as best seen in FIGS. 3 and 4. Truncated portion 48 has an inner edge 58 extending perpendicularly from inner side 54 of lower guard 20. Inner edge 58 terminates at an outer edge 60. Outer edge 60 extends from inner edge 58 to a rear edge 62 of perimeter wall 52. Outer edge 60 is tapered towards outer side 56 as best seen in FIG. 3. Inner edge 58 and outer edge 60 define the area through which a line of sight is provided, thus allowing the user to view blade exit point 28 even when lower guard 20 is in a fully retracted position. It should be noted that inner edge 58 could extend to outer side 56, thus eliminating outer edge 60. Such a structure would still provide a line of sight to workpiece 24 through transparent member 26, but would offer less coverage of blade 14 when lower guard 20 is in a normal, blade covering position.

In use, the user of saw 10 places planar base 21 on workpiece 24 and positions saw 10 so that the desired cut line is within alignment notch 23. The user then aligns saw 10 so that the front edge of blade 14 is also on the desired cut line. The user can view blade 14 for this purpose through transparent member 26. As the user begins to saw workpiece 24, lower guard 20 is rotated upwardly. The user can continually monitor the point at which blade 14 exits the workpiece by viewing this point through transparent member 26. As the user saws into workpiece 24, lower guard 20 will eventually be in a fully retracted position. The user can monitor blade exit point 28 even when lower guard 20 is in this fully retracted position due to truncated portion 48.

From the foregoing, it will be seen that this invention is one well-adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

We claim:

1. A window assembly for covering an aperture in a saw guard for a hand-held circular saw, comprising:

an optically transmissive member adapted to be coupled with the guard, said member substantially covering the aperture, said member having a top surface, a forward edge, opposed side edges and a rearward edge; and a projecting rib coupled to and extending outwardly from said guard adjacent said forward edge of said optically transmissive member;

wherein the projecting rib substantially prevents light emanating forwardly of the saw from reflecting off of said member.

2. The window assembly of claim 1, wherein said projecting rib extends along said opposed side edges of said optically transmissive member to substantially prevent light emanating from either side of the saw from reflecting off of said member.

3. The window assembly of claim 1, wherein said projecting rib is coupled to said member.

4. The window assembly of claim 3, wherein the saw has a circular blade for sawing a workpiece and a substantially planar base for supporting the saw on a workpiece, and wherein the said top surface of said member slopes downwardly from said rearward edge to said forward edge to form a rearwardly facing acute angle with respect to the planar base, said angle having a minimum value which reduces glare from overhead light sources that is the value of a bisecting angle of an angle formed by a first line extending from a first point where the periphery of the blade exits the top of the workpiece to said rear edge of said top surface of said member and a second line extending forwardly from said rear edge and parallel to said planar base.

5. The window assembly of claim 4, wherein said first point is determined when the blade is at its maximum cutting depth.

6. The window assembly of claim 1, wherein said transparent member is generally planar.

7. The window assembly of claim 6, wherein said projecting rib is opaque.

* * * * *